US007738585B2

(12) United States Patent
Sydir et al.

(10) Patent No.: US 7,738,585 B2
(45) Date of Patent: Jun. 15, 2010

(54) SCALABLE SYSTEM TO ADAPTIVELY TRANSMIT AND RECEIVE INCLUDING ADAPTIVE ANTENNA SIGNAL AND BACK-END PROCESSORS

(75) Inventors: Jaroslaw J. Sydir, San Jose, CA (US); Kamal Koshy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 11/234,581

(22) Filed: Sep. 23, 2005

(65) Prior Publication Data

US 2007/0071118 A1 Mar. 29, 2007

(51) Int. Cl.
*H04B 7/02* (2006.01)
*H04L 1/02* (2006.01)

(52) U.S. Cl. ....................... 375/267; 375/347; 375/260; 370/310; 370/347; 455/273

(58) Field of Classification Search .................. 375/267
See application file for complete search history.

(56) References Cited

U.S. PATENT DOCUMENTS

| | | | | |
|---|---|---|---|---|
| 6,177,906 | B1 * | 1/2001 | Petrus | 342/378 |
| 6,546,040 | B1 * | 4/2003 | Eschenbach | 375/140 |
| 6,795,018 | B2 * | 9/2004 | Guo | 342/372 |
| 6,937,623 | B2 * | 8/2005 | Cioffi et al. | 370/522 |
| 7,072,413 | B2 * | 7/2006 | Walton et al. | 375/267 |
| 2004/0219899 | A1 * | 11/2004 | Ho et al. | 455/273 |
| 2004/0240486 | A1 * | 12/2004 | Venkatesh et al. | 370/537 |
| 2005/0053170 | A1 * | 3/2005 | Catreux et al. | 375/267 |
| 2005/0163245 | A1 * | 7/2005 | Sandell | 375/267 |

* cited by examiner

*Primary Examiner*—Shuwang Liu
*Assistant Examiner*—Lihong Yu
(74) *Attorney, Agent, or Firm*—Schwabe, Williamson & Wyatt, P.C.

(57) ABSTRACT

An adaptive baseband processing system having a scalable architecture to allow scaling to support adaptive transmission and receive, at different granularity, channel vs. subchannel, for different number of antennas and/or users, including their components, are described herein. In various embodiments, the components include a front-end processor, an AAS processor and a back-end processor.

15 Claims, 8 Drawing Sheets

SCALABLE SYSTEM TO ADAPTIVELY TRANSMIT AND RECEIVE INCLUDING ADAPTIVE ANTENNA SIGNAL AND BACK-END PROCESSORS

TECHNICAL FIELD

Disclosed embodiments relate generally to the field of communications and more particularly to adaptive wireless transmission and receive, also referred to as adaptive beam forming.

BACKGROUND

Adaptive beam forming as practiced in wireless communication is a communication technique using multiple antennas to either transmit an electromagnetic signal (hereinafter, simply signal) to, or receive a signal from a remote wireless station. Adaptive beam forming can be used to extend the range of the system. For example, the range may be extended by focusing energy in the direction of distant subscriber stations. Moreover, adaptive beam forming can mitigate the effects of interferers, by placing interfering subscriber stations within nulls in the beam pattern. Additionally, adaptive beam forming may increase the capacity of the system, such as through the user Spatial Division Multiple Access (SDMA). Since it can be practiced from either the transmit or the receive direction, it is most often (but not necessarily) practiced at the base station of a wireless carrier service provider.

A key to adaptive beam forming is the calculation of the weights that are applied to the incoming signals. There are a variety of techniques that vary in terms of the frequency with which weights are calculated, the granularity over which the weights are calculated (e.g., one weight for all subcarriers of the subchannel or individual weights for individual subcarriers), and the domain in which the processing is performed (e.g., analog vs. digital, and time domain vs. frequency domain). In Orthogonal Frequency Domain Multiple Access (OFDMA) systems, beam forming is often performed on each subchannel or group of subchannels allocated to a subscriber station. Further, the weights are preferably calculated adaptively, taking into consideration various factors including the channel conditions and/or the locations of the subscriber stations.

Typically, as more antennas are employed, the system exhibits more degrees of freedom, thereby allowing a system to form more beams and nulls. Thus, the more flexible system may be configured to support more remote stations and/or more SDMA users. However, the complexity of the weight calculation increases as more antennas are employed and/or more SDMA users are supported. Also space and cost considerations at the deployment site often constrain the number of antennas that can be deployed in a cost effective manner. Thus, there is a wide range of base station needs, depending on the area and/or the number of users supported, and/or the number of antennas employed. This wide range of needs present a challenge to the system integrator and the component suppliers.

BRIEF DESCRIPTION OF THE DRAWINGS

Exemplary embodiments of the invention will be described, but not limited, by way of illustration in the accompanying drawings in which like references denote similar elements, and in which.

DETAILED DESCRIPTION

Figure 1:
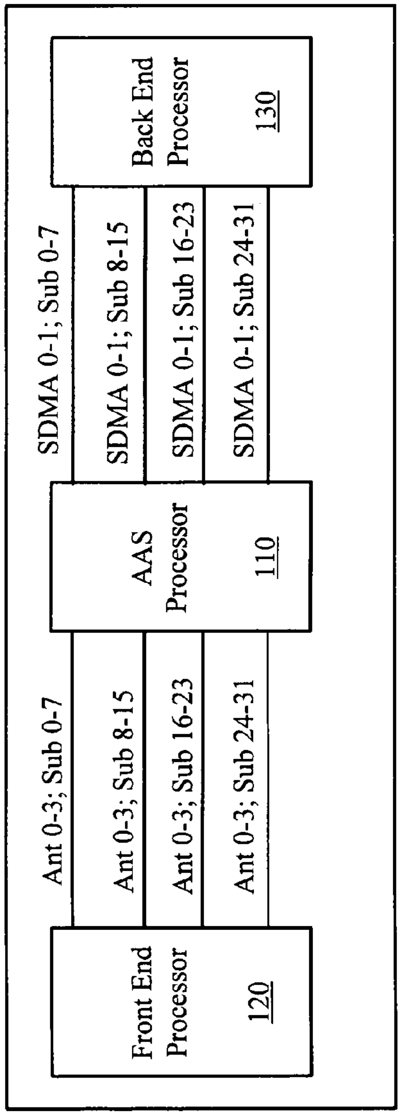
FIG. 1 illustrates a block diagram of an adaptive baseband processing system, in accordance with embodiments of the invention.

In the following detailed description, various embodiments will be described with some details, referencing the foregoing briefly described drawings, to facilitate understanding. For purposes of explanation, specific numbers, materials and configurations are set forth. However, it will be apparent to one skilled in the art that alternate embodiments may be practiced without the specific details. In other instances, well-known features are omitted or simplified in order not to obscure these embodiments.

Parts of the description will be presented in terms, such as data, signals, channels, sub-channels and the like, consistent with the manner commonly employed by those skilled in the art to convey the substance of their work to others skilled in the art. As well understood by those skilled in the art, these quantities take the form of electric, magnetic, RF, or optic signals capable of being stored, transferred, combined, and otherwise manipulated through electrical and/or optical components of a processor and its subsystems.

Various operations will be described as multiple discrete operations in turn, in a manner that is most helpful in understanding the various embodiments; however, the order of description should not be construed as to imply that these operations are necessarily order dependent. In particular, these operations need not be performed in the order of presentation.

Reference in the specification to "one embodiment" or "an embodiment" means that a particular feature, structure, or characteristic described in connection with the embodiment is included in at least one embodiment. The appearances of the phrase "in one embodiment" or "in an embodiment" in various instances in the specification do not necessarily all refer to the same embodiment; however, it may. The terms "comprising", "having", and "including" should be considered synonymous, unless context dictates otherwise. Nor should the use of any of these phrases imply or indicate that the particular feature, structure, or characteristic being described is a necessary component for every embodiment for which such a description is included.

The description will be presented in sections. Employment of section labels is to facilitate ease of understanding, and is not to be construed as limiting on the embodiment described therein.

Adaptive Beam Forming—Brief Overview

As briefly described earlier, adaptive beam forming is a technique for using multiple antennas either to transmit or to receive a signal from a remote wireless station. In the transmit direction, a weighted copy of the signal is transmitted from each of the antennas in the array. The signals from each of the antennas then combine and/or sum in the air and arrive at the receiving station as one signal (e.g., FIG. 8A). When the appropriate weights are applied, the signal transmitted from the antenna array forms a beam pattern which focuses energy (a beam) toward the intended receiver and away from (nulls) receivers for which the signal was not intended.

When beam forming is performed in the receive direction, each of the antennas at the receiver receive the transmitted signal. A weight is applied to each of the signals and they are summed together to form the received signal. The formation of beams and nulls is the same as in the transmit direction, except that in the case of receiving, the beams are locations from which more energy is received and the nulls are locations from which little or no energy is received (e.g., FIG. 8B).

Adaptive Baseband Processing System—Pre-Scaled Up Embodiments

Referring now to FIG. 1, wherein a block diagram illustrating an adaptive baseband processing system, in accordance with various pre-scaled up embodiments of the invention, is shown. As illustrated, for the embodiments, adaptive baseband processing (ABP) system 100 includes an adaptive antenna signal (AAS) processor 110 coupled to a front-end processor 120 and to back-end processor 130. More specifically, for the embodiments, communication with the front-end processor 120 includes signals exchanged with the four different antennas (0-3) and communication with back-end processor 130 includes Spatial Division Multiple Access (SDMA) data signals exchanged with two SDMA users (0-1).

Further, for the embodiments, each of the AAS, the front-end and the back-end processors 110, 120 and 130 is embodied in an integrated circuit (chip). In various embodiments, front-end processor 110 may be a time domain/Fast Fourier Transform (FFT) front-end processor, and back-end processor 120 may be a channel coding/decoding back-end processor.

In the illustrated embodiments, the received signals from the antennas are divided into thirty-two sub-channels (0-31). The signals received on each sub-channel from each antenna are transmitted to the AAS processor 110. Depending on the number of available input/output (I/O) terminals available, in various embodiments, multiple sub-channels or groups of sub-channels from the antenna are muxed for transmission to the AAS processor 110, i.e., with each subchannel group being communicated over one I/O terminal. For example, subchannels 0-7, 8-15, 16-23, and 24-31 are respectively muxed over respective I/O terminals between front-end processor 120 and AAS processor 100 as illustrated in FIG. 1.

For the purpose of this application, including the claims, "a group of subchannel" comprises one or more subchannels.

Additionally, back-end processor 130 includes communication channels for Spatial Division Multiple Access (SDMA) data signals exchanged with two SDMA users (0-1). The back-end processor 130 and AAS processor 110 divide the SDMA data signals into multiple subchannels (0-31) prior to transmission. Similarly, depending on the number of available input/output (I/O) terminals available, multiple sub-channels or groups of sub-channels may be muxed, with each sub-channel group communicated over one I/O terminal. For example, subchannels 0-7, 8-15, 16-23, and 24-31 are respectively muxed over respective I/O terminals between AAS processor 110 and back-end processor 120 as illustrated in FIG. 1.

Anyone of several different styles of beam forming, such as "adaptive beam forming" as previously discussed herein, may be processed by a suitably configured AAS processor 110. Exemplary adaptive algorithms include least mean squares (LMS), normalized LMS (NLMS), recursive least squares (RLS), and the like. As the calculations are being performed at or near real-time, algorithms with fast convergence, such as RLS, are frequently used.

Scalable Architecture

Figure 2:
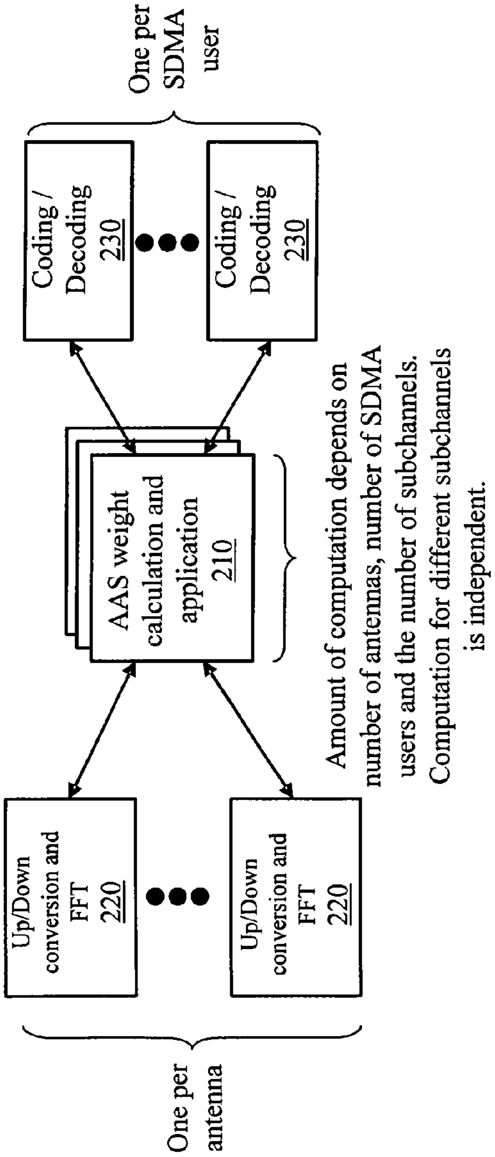
FIG. 2 illustrates a block diagram of the scalable architecture of the adaptive baseband processing system of FIG. 1.

Referring now to FIG. 2, wherein a block diagram illustrating the scalable architecture of ABP system 100 is shown. Scalable architecture 200 is designed to allow additional components, i.e. additional front-end, AAS and back-end processors 120, 110 and 130 to be employed to support the scaling up ABP system 100 to support more antennas, users and/or channels, and so forth. Each of front-end, AAS and back-end processors 120, 110 and 130 is designed to support scalable architecture 200.

Under scalable architecture 200, each of front-end, AAS and back-end processors 120, 110 and 130 includes an I/O interface having I/O terminals such that each front-end processor 120 can be coupled to each and every AAS processor 110; and, likewise, each back-end processor 130 can be coupled to each and every AAS processor 110. More specifically, under scalable architecture 200, as more front-end processors 120 are employed to support more antennas, the various subchannels may be routed to different AAS processors 110 for processing, allowing more AAS resources to be applied, however, the subchannels of all antennas are all routed to one AAS processor 110, such that the particular AAS processor 110 processes the signals received on all of the antennas on the particular subchannels. Similarly, as more back-end processors 130 may be employed to support more SDMA users, the various subchannels may be routed to different AAS processors 110 for processing, allowing more AAS resources to be applied, however, the subchannels of all SDMA users are all routed to one AAS processor 110, such that the particular AAS processor 110 processes the data from all SDMA users in the particular subchannels.

Accordingly, as will be described in more detail below, each front-end processor 120 includes a number of sets of up/down conversion and/or FFT resources 220 (physical and/or virtual), such that one set may be allocated for each antenna. Further, each front-end processor 120 includes an I/O interface to allow the various subchannels received by the supported antennas to be routed to one or more AAS processors 110. Each AAS processor 110 in turn includes a front-end interface and adaptive weight calculation resource 210 that support such subchannel routing.

Similarly, each back-end processor 130 includes a number of sets of coding/decoding resources 230 (physical and/or virtual), such that one set may be allocated for each SDMA user. Further, each back-end processor 130 includes an I/O interface to allow the subchannels associated with the supported SDMA users to be routed to one or more AAS processors 110. Each AAS processor 110 in turn includes a back-end interface and adaptive weight calculation resource 230 that support such subchannel routing.

Therefore, a scalable ABP system 100, implemented in accordance with scalable architecture 200 may employ multiple processing components according to the number of antennas that are to be supported and deployed, the number of supported SDMA users, and/or the size of the channels to be supported. The scalable ABP system 100 includes one or more AAS processors 110 coupled to one or more front-end processor 120 and to one or more back-end processors 130.

Each front-end processor 120 performs digital up-conversion/down-conversion, FFT/IFFT, and subchannel mapping/demapping for a given number of antennas. To support more antennas, multiple front-end chips may be deployed in parallel to support the desired number of antennas.

In a similar fashion, each back-end processor 130 supports a given number of SDMA users. If more SDMA users are to be supported, multiple back-end processors may be deployed to support the desired number.

The AAS processor 110 is designed to perform a given amount of AAS processing. In deployments where a single AAS processor 110 cannot handle the processing load for the number of antennas and SDMA users, multiple AAS processors 110 may be deployed. The processing load is a function of the number of antennas, the number of SDMA users, and the channel bandwidth. The weight calculation is performed together for all of the antennas and SDMA users in the system.

The processing workloads are divided among the AAS processors 110 by dividing the signals according to the channels/subchannels, where a subset of the subchannels is assigned to each of the AAS processors 110. As described earlier the I/O interfaces between the front-end processors 220 and the AAS processors 210 and between the AAS processors 210 and back-end processors 230 are designed to allow data from different subchannels to be routed to separate AAS processors 210.

Embodiments of AAS-capable base stations vary greatly in terms of capability and complexity due in part to the scalable architecture. As indicated previously variables that determine the processing power required by a given base station physical layer (PHY) are the number antennas, number of SDMA users, and the size of the channel. In one embodiment, using Institute of Electrical and Electronics Engineers (IEEE) 802.16e draft under development, IEEE Draft P802-16e/D10 published Aug. 9, 2005 to replace IEEE std. 802.16-2004 published Oct. 1, 2004, the size of the channel translates into the number of subchannels to be supported. In one embodiment, each symbol consists of a given number of subcarriers, each representing an FFT point. The number of FFT points is generally chosen proportionally with the size of the channel to be supported by the scalable adaptive base station. In one embodiment, based upon IEEE P802.16e/D10, the FFT sizes range from about 128 to about 2048 points. The subcarriers are grouped into subchannels which are the basic unit of allocation in the frequency dimension of the frame. There is a separate stream of symbols coming out of the front-end chip for each antenna. AAS weight calculations take into account the data from all of the antennas in the array. However, the calculation of weights in an individual subchannel depends only on the data from the subcarriers that make up that subchannel. Data from all antennas in a particular subchannel is used to calculate the weights in that subchannel. The processing of different subchannels is therefore independent. There is a separate stream of symbols going into the back-end chips for each SDMA user.

Supporting a range of base station sizes requires that different parts of the base station PHY scale differently depending on the type of processing load. For example, the processing requirements in the up-conversion/down-conversion and FFT portion scale with the number of antennas that are deployed. Similarly, the channel coding portions of the base station PHY scale with the supported number of SDMA users, which is loosely related to the number of antennas, but is also subject to other constraints. The amount of processing required in AAS weight calculation and application sections of the base station PHY are functions of the number of antennas and the number of SDMA users, but data from all antennas are processed together. The processing of subchannels is independent, so the physical hardware may be scaled by adding processing power for processing additional subchannels.

A Scaled-Up Embodiment

Figure 7:
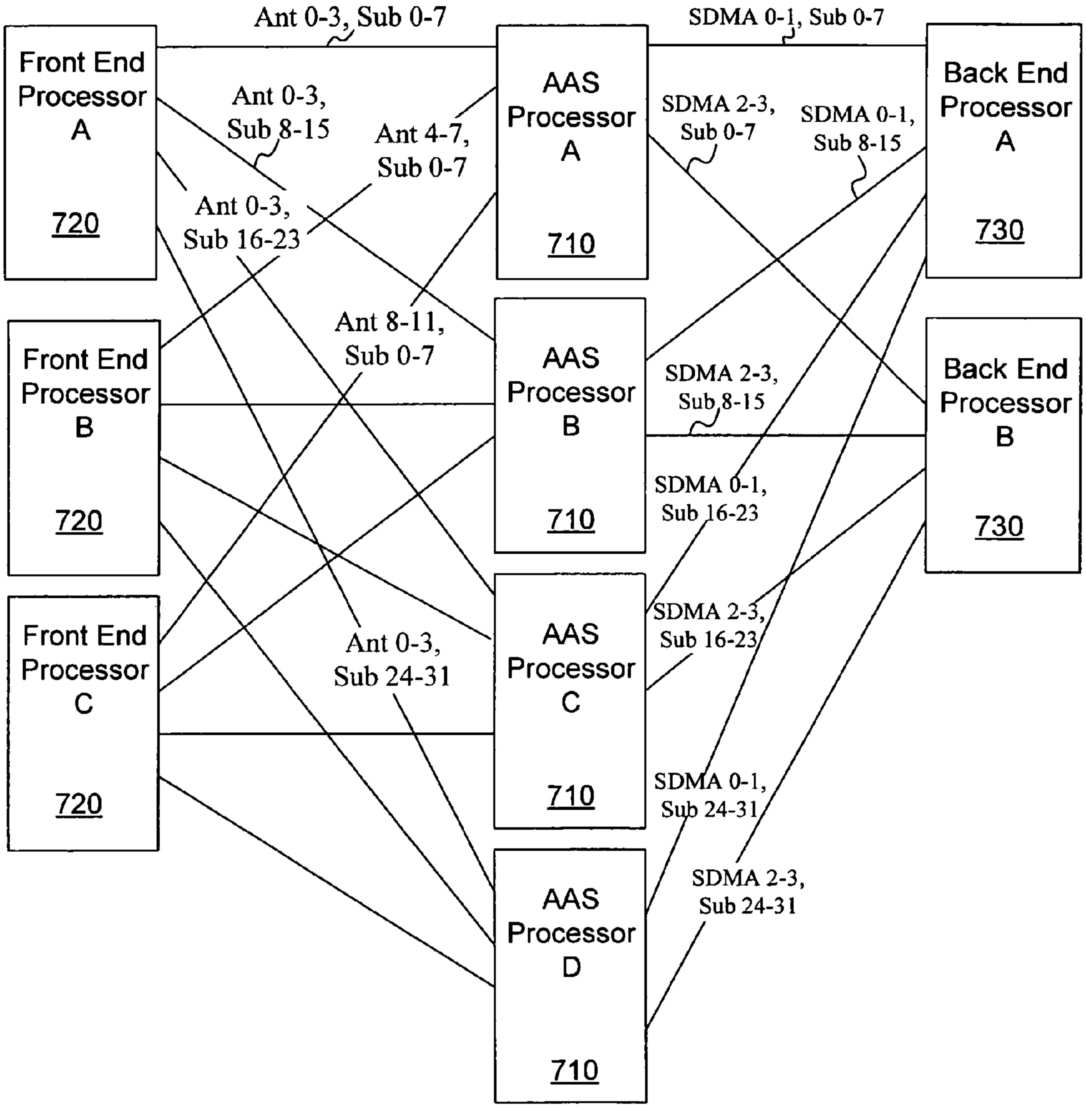
FIG. 7 illustrates a block diagram of an exemplary scaled up adaptive baseband processing system, configured to process signals from twelve antennas and from four SDMA users, in accordance with various embodiments.

FIG. 7 illustrates an exemplary ABP system, in accordance with various scaled up embodiments. For illustrative purpose, exemplary ABP system 700 is scaled up to support 12 antennas and four SDMA users. Further, a channel is divided into 32 sub-channels. Those skilled in the art will appreciate in practice, many more antennas, subchannels, and/or SDMA users may be supported. However, for ease of understanding, but without loss of generality, the illustration is limiting the number of antennas, subchannels, and SDMA users.

In the illustrated embodiment, system 700 uses four AAS chips 710 in its largest configuration, a 12 antenna deployment. In this implementation, the interface between the front-end chip 720 and the AAS chips 710 is structured as a set of four separate physical interfaces. Each of these interfaces carries the data from eight subchannels for all four antennas. The interfaces between the AAS chips 710 and back-end chips 730 take on a similar format. Specifically, a separate physical interface exists for each group of subchannels. Data from multiple SDMA users is multiplexed over the interfaces between the back-end chips 730 and the AAS chips 710 in the same fashion as data from multiple antennas is multiplexed over the front-end to AAS chip interfaces.

Thus, the embodiment of the baseband base station illustrated in FIG. 7 provides a detailed architecture of a system 700 coupled to 12 antennas, 4 SDMA users, and 32 subchannels. In the largest configuration, a 12 antenna deployment, the system 700 uses four AAS chips 710 to support three front-end chips 720 and two back-end chips 730. Each front-end chip 720 is configured to support four antennas, while each back-end chip 730 is configured to handle two SDMA users.

Accordingly, each of the AAS chips 710 are configured to process all thirty-two subchannels and have four physical interfaces; however, in the current configuration the AAS chips 710 can support eight of the thirty-two subchannels as the system 700 uses twelve antennas. Three of the four physical interfaces on the AAS chip 710 receive data from eight of the subchannels of the twelve antennas. In this case each of these three interfaces carries data from the same set of subchannels, each from the four antennas serviced by one of the three front-end chips.

The four interfaces of front-end chip 720 are connected each to a separate instance of the AAS chip 710, so that the data for each group of 8 subchannels is routed to a separate AAS chip 710. In the illustrated embodiment, each of the interfaces is connected to one of the Front-end chips 720 so that the first interface carries data from antennas 0-3, the second carries data from antennas 4-7, and the third carries data from antennas 8-11. While these connections are shown in FIG. 7, they are not all labeled due to lack of space. In alternate embodiments, the AAS chip receives signals on one or more subchannels from one or more front-end chips coupled to one or more antennas and signals on one or more subchannels from one or more back-end chips coupled to one or more users.

In one embodiment, alternate deployments, in which the number of antennas is varied between four and twelve, may be constructed using this architecture, with the subchannels divided among the AAS chips used to support the processing load. Thus the structure described and illustrated enables flexible deployment of AAS chips 710 to support base stations with a range of antenna array sizes. A single AAS chip can be used in all deployments. This flexibility enables a PHY processor chipset to support a wider range of base station designs and deployments. Such flexibility would enable the industry to move from a expensive custom design development model, where base station manufacturers develop their own customized FPGA or ASIC based solutions, to a merchant silicon model, where processor manufactures may provide flexible configurable chipsets that allow base station vendors to build a variety of base stations, each using the same fundamental chipset thereby driving down the costs of the base station hardware.

Representative connection identifiers illustrate the connection relationships in the illustrated embodiment between the AAS chips 710, the front-end chips 720, and the back-end chips 730. As indicated, in one embodiment, each AAS chip 710 shares eight subchannels with the each of the group of antennas via the front-end chips 720. Similarly, each AAS shares the same eight subchannels with the SDMA users via the back-end chips 730. In an alternate embodiment, an AAS chip receiving all thirty-two sub-channels from four antennas coupled to the front-end chip could also support four SDMA users coupled to the back-end chips.

More specifically, FIG. 7 illustrates two back-end chips 730 (A & B), each processing two of the SDMA users for a total of four users. On the AAS chips 710 (A, B, C, & D) only two of the four interfaces configured for the back-end are used. On AAS chip A, one interface is connected to back-end chip A and carry data from subchannels 0-7 for SDMA users 0 and 1 and the other interfaces are connected to back-end chip B and carry data from subchannels 0-7 for SDMA users 2 and 3. In a similar fashion the other AAS chips (B, C, &D) are connected to the two back-end chips (A & B). These connections are shown in FIG. 7. Each of the back-end chips 730 uses all four of its interfaces and is connected to each of the AAS chips 710. For example, back-end chip A is connected to AAS chip A, receiving data from subchannels 0-7 for SDMA users 0 and 1, to AAS chip B, receiving data from subchannels 8-15, to AAS chip C, receiving data from subchannels 16-24, and to AAS chip D, receiving data from subchannels 24-31. The other back-end chip B is also connected to each of the AAS chips 710 receiving data from each of the groups of subchannels for SDMA users 2 and 3.

Components

Figure 3:
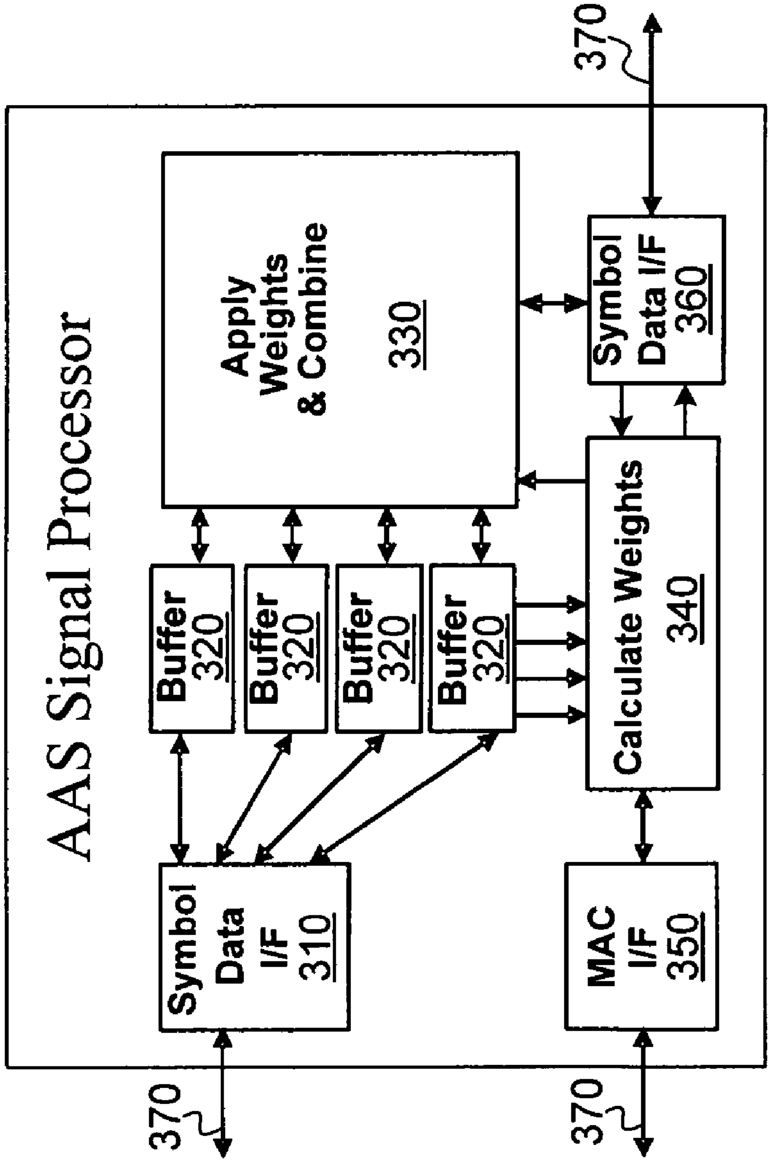
FIG. 3 illustrates a block diagram of an adaptive signal processor, in accordance with various embodiments.
Figure 4:
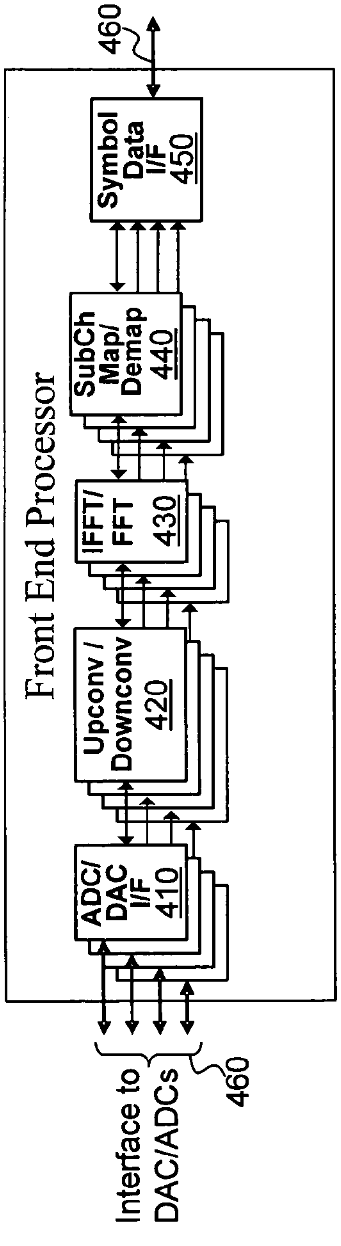
FIG. 4 illustrates a block diagram of a front-end processor, in accordance with various embodiments.
Figure 5:
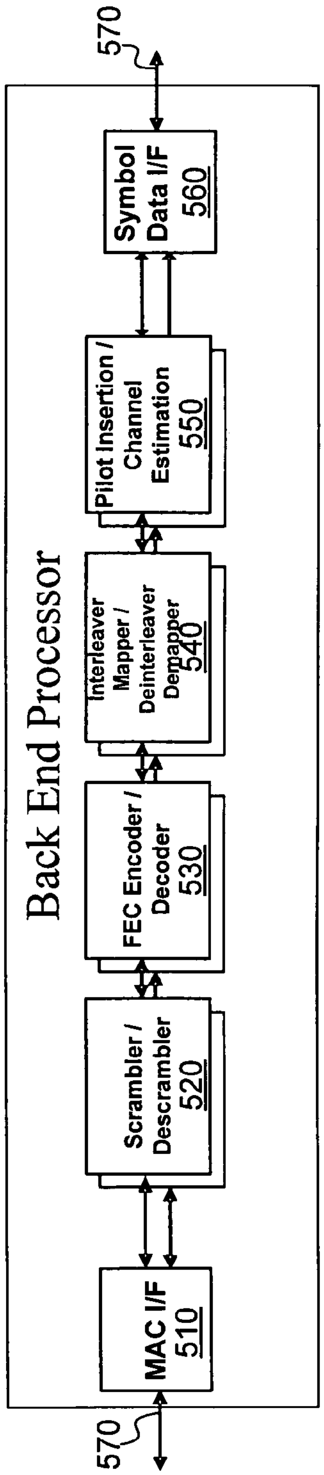
FIG. 5 illustrates a block diagram of a back-end processor, in accordance with various embodiments.

FIGS. 3-5 illustrate a more detail view of each of the front-end, AAS and back-end processors, in accordance with various embodiments. As described earlier, in various embodiments, each of front-end, AAS and back-end processors 110, 120 and 130 is embodied in an integrated circuit. In alternate embodiments, each of front-end, AAS and back-end processors 110, 120 and 130 may be implemented in a variety of other ways including but not limited, field programmable devices, such as FPGAs, or software running on a digital signal or other specialized processors. In various embodiments, the three ASICs/FPGA represent a novel partitioning the processing elements of the physical layer (PHY) of a networking/communication device.

FIG. 3 illustrates an AAS processor 300 in further detail, in accordance with various embodiments. For the embodiments, AAS processor 300 includes a plurality of input/output (I/O) terminals 370 and processing logic (implemented in one or more modules) coupled to the I/O terminals 370. The processing logic includes a front-end symbol data interface 310, a plurality of buffers 320, weight application and combination module 330, weight calculation module 340, Media Access Control (MAC) interface 350, and a back-end symbol data interface 360, coupled to each other as shown. In various embodiments, the plurality of buffers 320 includes at least one buffer allocated for each physical interface on the signal processor 300.

AAS weight calculation and application are performed in AAS processor 300. For the embodiments, the processing in the illustrated AAS processor 300 is done on a subchannel basis (accordingly, the weights are calculated and applied on a subchannel basis). In one embodiment AAS processor 300 is designed to be able to handle a range of antennas, SDMA users, and subchannels. For example, in one embodiment AAS processor 300 could be designed to handle the processing of all subchannels from the largest supported channel for a four antenna, 2 SDMA user system. The same AAS processor 300 could also be configured to handle the processing of half of the subchannels for an 8 antenna, 4 SDMA user system. As the AAS weight calculation is independent between the subchannels, both of these configurations can be done using the same AAS processor 300. When the desired system includes more subchannels than can be processed in a single AAS signal processor, multiple AAS signal processors are used by splitting signals between AAS signal processors on a subchannel basis.

In one embodiment, AAS processor 300 is able to perform all of the processing on single chip deployments as well as calculating and applying subchannel weights to scale across multiple processors to support larger antenna arrays. The calculation of AAS weights is a computationally intensive process conducted by weight calculation module 340. The amount of computation scales linearly with the number of subchannels and as a cube relative to the number of antennas in the array. As a result of this uneven scaling the front-end symbol data interface 310, the Media Access Control (MAC) interface 350, and a back-end symbol data interface 360 accommodate disproportionate scaling.

The interfaces (310, 350 and 360) each exhibit a separate physical interface having physically separate pins for each subchannel or group of subchannels. As such, the data from separate subchannels or groups of subchannels may be routed to physically different AAS signal processors. Moreover, the data from multiple antennas on a single front-end chip can be multiplexed on the same physical interface. This enables data from multiple antennas for a given subchannel or group of subchannels to be multiplexed and further reduce the number of pins. In an alternate embodiment, the interfaces (310, 350 and 360) may be configured to accept all subchannels for a smaller number of antennas or a subset of the subchannels from a larger number of antennas.

FIG. 4 illustrates a front-end chip 400. The front-end chip 400 includes a plurality of input/output (I/O) terminals 460 and processing logic coupled to the I/O terminals 460. In one embodiment, a portion of the processing logic is configured to process a signal received through a plurality of antennas and output the signal for one or more AAS or signal processors by outputting a plurality of subchannels and/or a plurality of groups of subchannels corresponding to the signal through the plurality of I/O terminals 460, one subchannel or one group of subchannels per I/O terminal 460.

In one embodiment, a portion of the processing logic is configured to process a plurality of subchannels or a plurality of groups of subchannels of a signal that is received through the plurality of I/O terminals 460, one subchannel or one group of subchannels per I/O terminal 460, for transmission through a plurality of antennas. In this manner, the digital Up-conversion and/or Down-conversion 420, Fast Fourier transforms (FFT) and/or inverse FFT (IFFT) 430, and subchannel mapping/demapping 440 for a chosen number of antennas are implemented in the front-end chip 420. This chip 420 has interfaces to the ADC/DACs 410 for each of the supported antennas and a symbol data interface 450 for each attached signal processor 300. The number of antennas supported in this chip 420 depends on the minimum size and range of the antenna array sizes that are to be supported. In the front-end chip 420, the processing is done on a per antenna basis. In the illustrated embodiment shown in FIG. 4, the front-end chip 420 supports four different antennas. In alternate embodiments the front-end chip may support one or more antennas.

In one embodiment, the signal received through the plurality of antennas for a given subchannel or group of subchannels is multiplexed on the same I/O terminal 460 to reduce the number of I/O terminals 460. Similarly, one embodiment multiplexes symbol data received from the signal processor for a given subchannel or group of subchannels on the same I/O terminal 460 to reduce the number of I/O terminals 460 prior to transmission of the data through the plurality of antennas.

FIG. 5 illustrates a back-end chip 500. The back-end chip 500 includes a plurality of input/output (I/O) terminals 570 and processing logic coupled to the I/O terminals 570. In one embodiment, the processing logic includes MAC interface 510 scrambler and/or descrambler 520, FEC encoder and/or decoder 530, interleaver mapping and/or deinterleaver demapping 540, pilot insertion and/or channel estimation modules 550, and symbol data interface 560 for a given number of SDMA users.

In one embodiment, a portion of the processing logic is configured to process a signal received through a plurality of SDMA users at MAC interface 510 and outputting the signal via symbol data interface 560 for one or more AAS signal processors external to the apparatus, such as previously described signal processor 300, by correspondingly outputting a plurality of subchannels and/or a plurality of groups of subchannels of the signal through the plurality of I/O terminals 570. In one embodiment, one subchannel or one group of subchannels is outputted per I/O terminal 570.

In one embodiment, a portion of the processing logic is configured to process a plurality of subchannels or a plurality of groups of subchannels of a signal that is received through the plurality of I/O terminals 570, one subchannel or one group of subchannels per I/O terminal 570, for transmission to a plurality of SDMA users. The number of SDMA users supported by the back-end chip 500 depends on the minimum size and channel range to be supported. In the illustrated embodiment shown in FIG. 5, the back-end chip 500 supports two SDMA users. In alternate embodiments the back-end chip may support one or more SDMA users. If more SDMA users are to be supported, multiple back-end chips are deployed to support the desired number.

Data Flow

Figure 6:
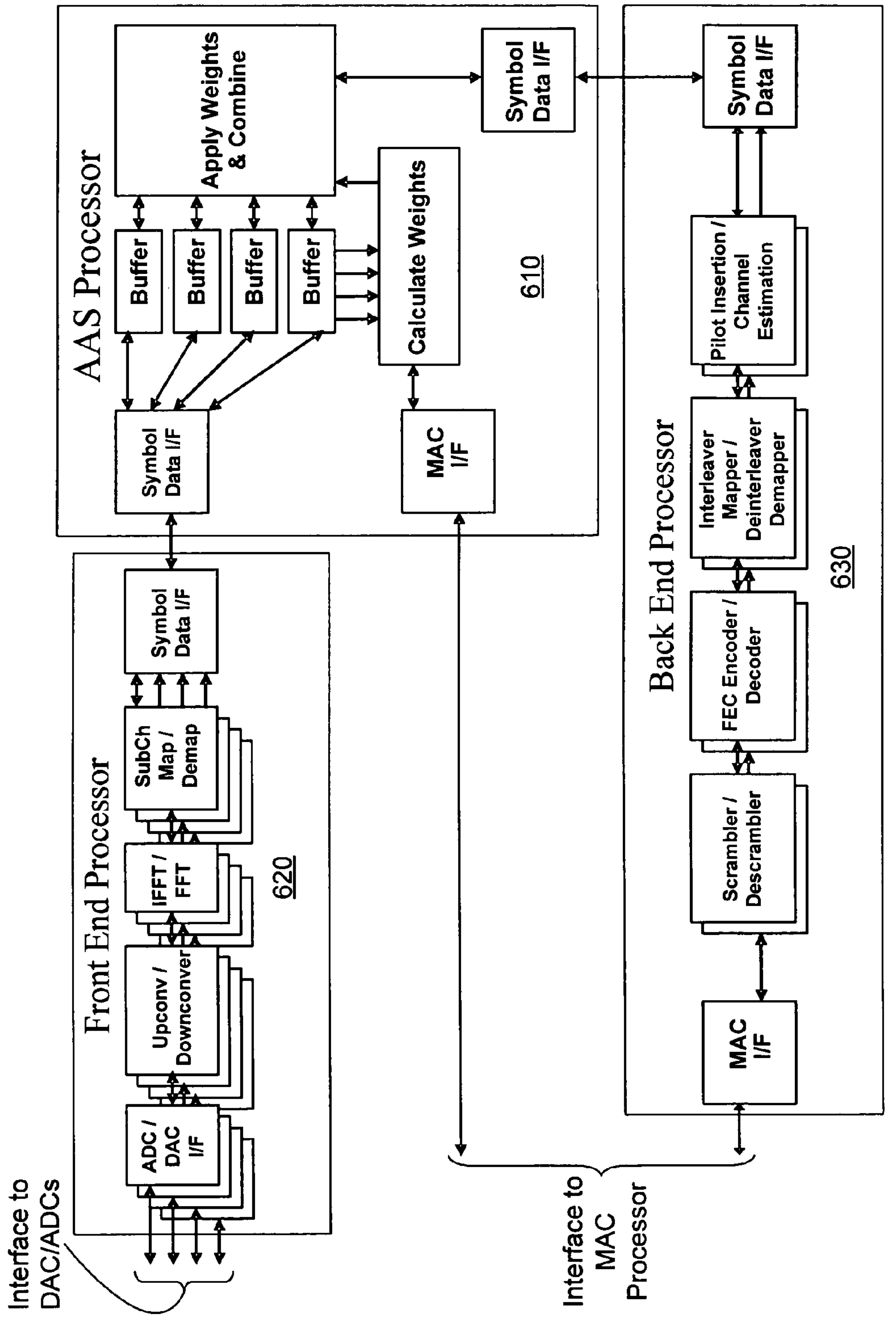
FIG. 6 illustrates a more detailed block diagram of the adaptive baseband processing system of FIG. 1, employing the components of FIG. 3-5, in accordance with various embodiments.

Referring now to FIG. 6, wherein a block diagram further detailing a scalable ABP system 600 using the components of FIG. 3-5, and its data flow, in accordance with various embodiments, is shown. The scalable ABP system 600 having an interface with MAC processors of the SDMA users and an ADC/DAC interface associated with the plurality of antenna. The scalable adaptive base station 600 includes an AAS chip 610, a front-end chip 620, and a back-end chip 630.

Data that flows between the front-end chip 620 and AAS chip 610 and between AAS chip 610 and back-end chip 630 is symbol data. In one embodiment, each symbol consists of a given number of subcarriers, each representing an FFT point, whose number depends on the size of the channel being supported by the scalable adaptive base station 600. The subcarriers are grouped into subchannels which are the basic unit of allocation in the frequency dimension of the frame. There is a separate stream of symbols coming out of the front-end chip for each antenna. The calculations and applications of weights in an individual subchannel are independent and depend only on the data from the subcarriers that make up that subchannel. Thus, data from all antennas in a particular subchannel are used to calculate the weights in that subchannel.

In the illustrated configuration the embodiment supports 4 antenna and 2 SDMA users. To support more antennas, multiple front-end chips 620 may be deployed in parallel to support the desired number of antennas. In a similar fashion, each back-end chip 630 supports a given number of SDMA users. If more SDMA users are to be supported, multiple back-end chips 630 may be deployed to support the desired number. The AAS chip 610 is designed to perform a given amount of AAS processing. In deployments where a single AAS processor 610 cannot handle the processing load for the number of antennas and SDMA users, multiple AAS chips 610 may be deployed. The processing load of the scalable adaptive base station 600 is a function of the number of antennas, the number of SDMA users, and the channel bandwidth.

Network Environment

Figure 8A:
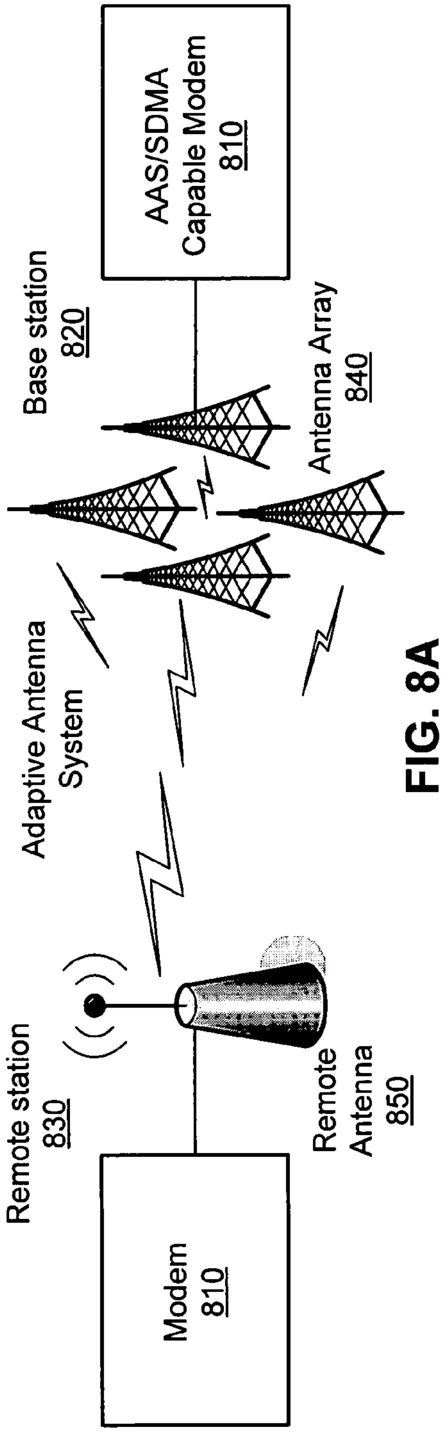
FIG. 8A illustrates a block diagram of a wireless networking environment suitable for applying various embodiments of various aspects of the invention.
Figure 8B:
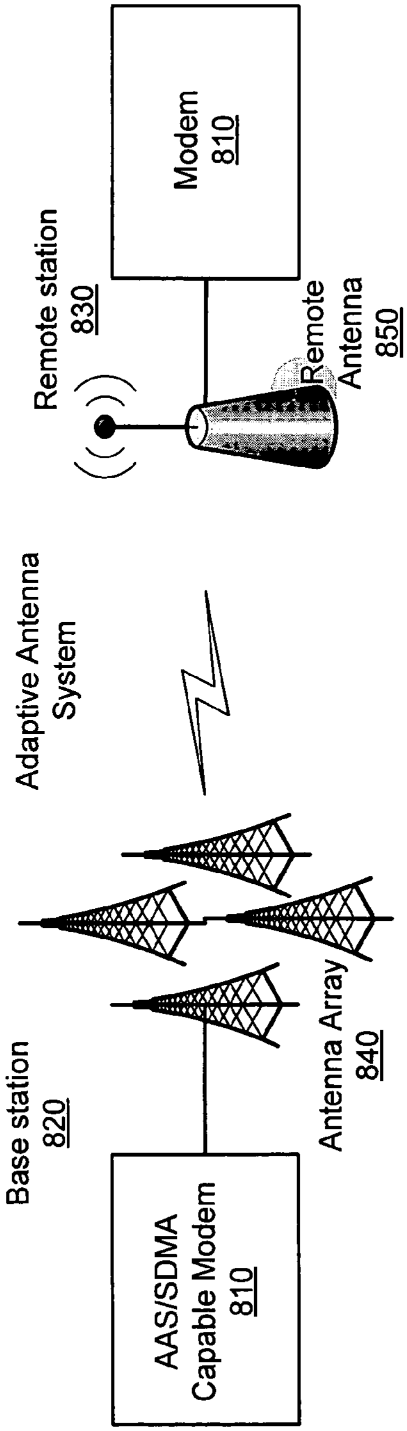
FIG. 8B illustrates a block diagram of a wireless networking environment suitable for applying various embodiments of various aspects of the invention.

Referring now to FIGS. 8A & 8B, an adaptive transmit and receive operating environment 800 between a base station 820 and a remote station 830 in accordance with at least one embodiment is shown. The network environment may also be referred to as an adaptive antenna system (AAS). The base station 820 includes an AAS capable modem/baseband processor 810 coupled to antenna array 840. The illustrated antenna array 840 using at least four antennas. The remote station 830 may be a conventional remote station coupled to a single omnidirectional remote antenna 850. FIGS. 8A & 8B also illustrate that adaptive beam forming may be directionally performed in both receive and transmit directions. As such, in one embodiment, the process of beam forming may be deployed by placing an array of antennas at only one end of a wireless link. Accordingly, the other end of the wireless link may even use only a single antenna. Alternatively, the other end of the communications link may also use an adaptive antenna system. The illustrated AAS operating environment 800 employs adaptive beam forming includes deploying the antenna array 840 at the base station 820 where the cost of deploying multiple antennas can be more easily accommodated.

When the base station transmits to the subscriber station (FIG. 8A), a weighted copy of the signal is transmitted from each of the antennas in the antenna array 840. The signals from each of the antennas then combine in the air (see e.g., FIG. 8A) and arrive at the receiving remote station 850 as one signal. When the appropriate weights are applied, the signal transmitted from the antenna array forms a beam pattern which focuses energy towards the intended receiver and away from receivers for which the signal was not intended. The receivers for which the signal was intended is often called a beam and the remaining receivers for which the signal was not intended are often referred to as nulls.

When the base station receives from the subscriber station (FIG. 8B), each of the antennas at the receiver receives the transmitted signal. A weight is applied to each of the signals and they are summed together to form the received signal. The formation of beams and nulls is the same as in the transmit direction, except that in this case, the beams are locations from which more electromagnetic signal energy is received and the nulls are locations from which little or no energy is received.

Design/Configuration and Operation Methods

Figure 9:
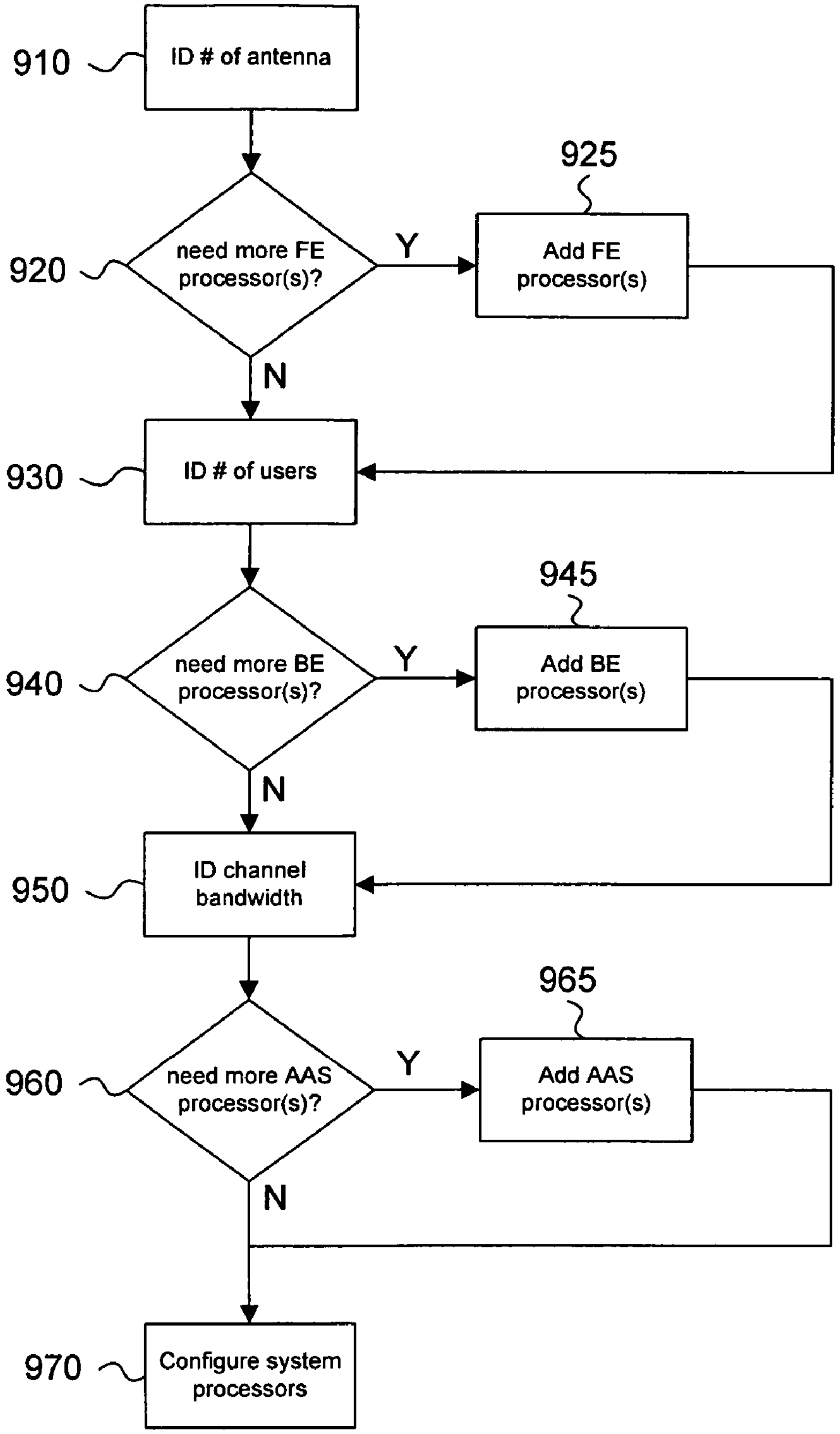
FIG. 9 illustrates a method for designing/configuring a scalable adaptive baseband processing system, in accordance with various embodiments.
Figure 10:
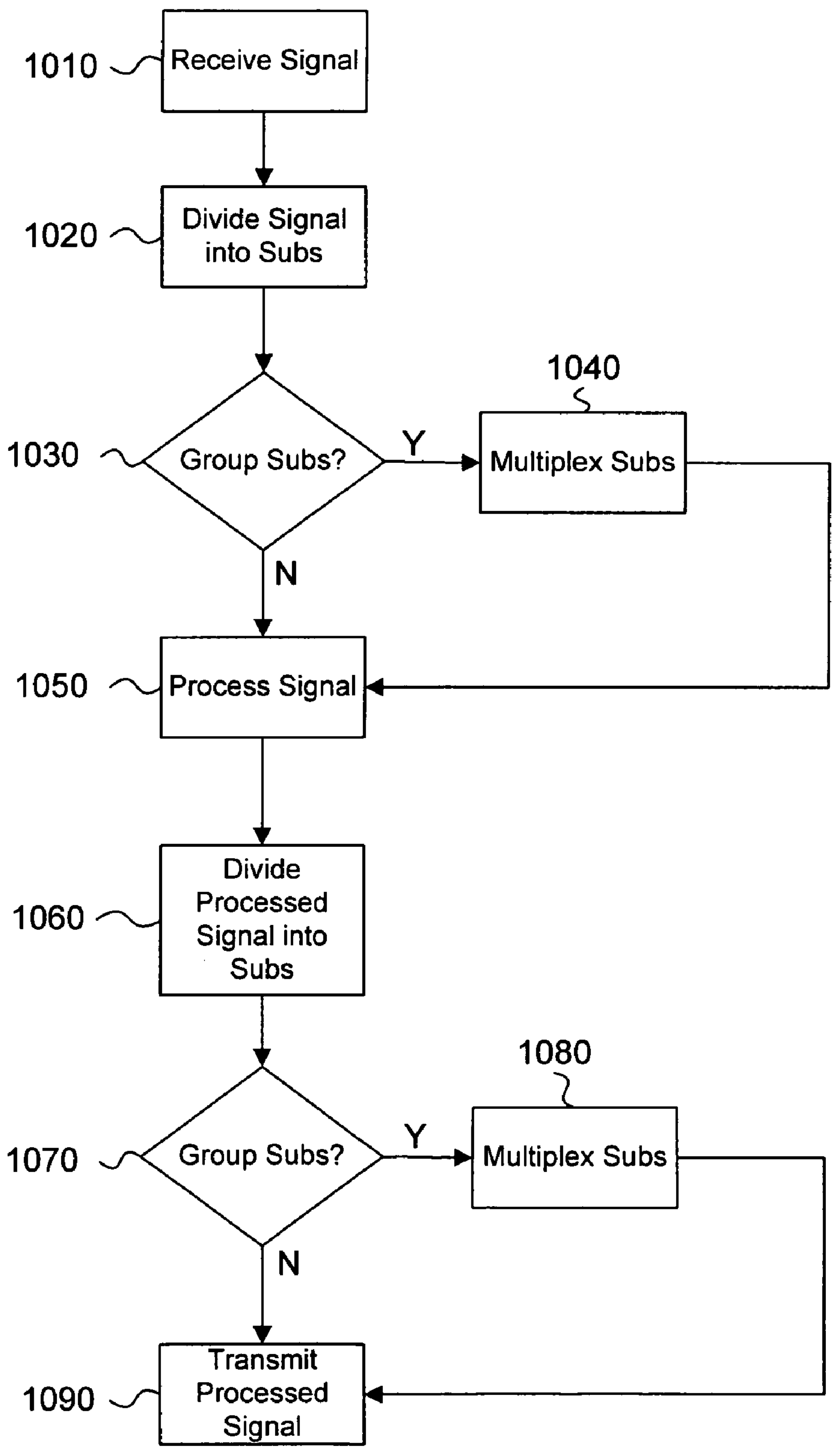
FIG. 10 illustrates a method of operating a scalable adaptive baseband processing system, in accordance with various embodiments.

Turning now to FIGS. 9 and 10, the particular methods are described in terms of computer software and hardware with reference to a series of flowcharts. The methods to be performed by or on a processing device may constitute design decisions or state machines or computer programs made up of computer-executable instructions. Describing the methods by reference to a flowchart enables one skilled in the art to develop such programs including such instructions to carry out the methods on suitably configured processing devices (e.g., a processor of a station executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, process, application, and function), as taking an action or causing a result. Such expressions are merely a shorthand way of saying that execution of the software by a network device causes the processor of the computer to perform an action or a produce a result.

FIG. 9 illustrates a flowchart of a design/configuration process 900 suitable for use in accordance with various embodiments. The process 900 identifies the number of antenna in block 910. In one embodiment, block 910 identifies the maximum number of antenna that can be attached to the system 900. Upon determining the number of antenna to be used in the system, query block 920 identifies whether additional front-end processor should be applied to the system 900. If the current configuration or design is deficient block 925 provides for additional front-end processors and proceeds to block 930. Otherwise the process 900 proceeds directly to block 930. In an alternate configuration, the process 900 may recommend the removal of a front processor when fewer antennas are to be used.

Block 930 identifies the number of SDMA users to be supported by the system. In one embodiment, this may be the number of SDMA users currently supported by the system. In an alternate embodiment useful for system design purposes, the maximum number of SDMA users to be supported is determined. For example, in one embodiment the process 900 determines the maximum number of SDMA users that may be supported. Once the number of SDMA users is identified, query block 940 determines whether the process 900 needs more back-end processors. If so block 945 adds back-end processors to the process 900 and continues to block 950. Otherwise the process 900 continues directly to block 950. In an alternate embodiment, the process may also determine whether a back-end processor should be removed.

In block 950 the process 900 identifies the channel bandwidth. In one embodiment, this involves determining how many subchannels or groups of subchannels are present between the front-end processor(s) and the back-end processor(s). Once the number of antennas, number of users, and channel bandwidth in process 900 has been determined, query block 960 determines whether more AAS signal processor(s) are necessary. If the processing load is determined to use additional AAS signal processor(s), block 965 adds the necessary AAS signal processor(s). In an alternate embodiment, the process may also determine whether an AAS signal processor should be removed.

Upon completion of query block 960 and/or block 965, the process 900 configures all of the processors in block 970. In one embodiment this includes front-end, back-end and AAS signal processors. Configuration may include interconnecting and multiplexing signals from the processors via a plurality of I/O terminals to accommodate a plurality of subchannels.

FIG. 10 illustrates a flowchart of an exemplary method of operation for an ABP system, in accordance with various embodiments. Under process 1000, an ABP system receives a signal in block 1010 from attached resources, such as an antenna array or a SDMA user. Upon receipt, the signal is divided into subchannels in block 1020. If the signal was received from the antenna array of the system, the division is accomplished in the front-end processors. The back-end processors divide the received signal if the signal was received by the system from a SDMA user. In query block 1030 the system determines whether the subchannels are to be grouped for transmission. If the system does not group the subchannels, the signal proceeds to block 1050. Otherwise the system multiplexes the subchannels in block 1040 prior to completing signal processing in block 1050.

In one embodiment the processing of the signal in block 1050 is performed by AAS signal processors as previously discussed. Generally, block 1050 involves calculating, applying, and combining weights for the different subchannels. As the processing can be performed independently for each antenna, user, and/or subchannel, the station 1000 may optimize performance through selection of system processors (FE, BE, and AAS processors) as previously outlined. In one embodiment, the weights that are applied to the incoming signals are calculated for adaptive beam forming. There are a variety of exemplary adaptive beam forming calculation techniques that may be used to perform the calculation. Exemplary Adaptive algorithms include least mean squares (LMS), normalized LMS (NLMS), and recursive least squares (RLS). Some embodiments use calculation techniques that vary the frequency with which weights are calculated. Some embodiments use techniques to adjust the granularity over which the weights are applied. For example, some embodiments may use techniques that vary granularity of all of the subcarriers of the channel. Similarly, embodiments may even vary individual subchannels independently. Some embodiments use techniques that vary the domain in which the signal processing is performed, such as analog vs. digital and/or time domain vs. frequency domain.

Once the signal has been processed, block 1060 divides the processed signal into subchannels. Query block 1070 determines whether the subchannels should be grouped for transmission. If grouping is necessary, block 1080 multiplexes subchannels together. The system transmits the subchannel and/or groups of subchannels of the processed signal in Block 1090.

Thus, it can be seen from the above descriptions that various novel methods, apparatus, and system architectures to scale different adaptive processor portions have been described. While described in terms of the earlier described embodiments, those skilled in the art will recognize that the embodiments are not limited to the embodiments described and can be practiced with modification and alteration within the spirit and scope of the appended claims of the non-provisional application to follow. Thus, the description is to be regarded as illustrative instead of restrictive.

What is claimed is:

1. An apparatus comprising:

a plurality of processing modules associated with a plurality of groups of subchannels such that each processing module is assigned to process symbol data of a corresponding group of subchannels, each subchannel group including a respective plurality of subchannels, wherein subchannels of individual groups are different from subchannels of other groups;

a plurality of front end processors, wherein each of the plurality of processing modules is coupled to each of the plurality of front end processors, and wherein each of the plurality of front end processors is configured to receive and process signals from a respective group of antennas and output symbol data for the plurality of subchannel groups, such that each of the plurality of processing modules receives the symbol data for the corresponding group of subchannels from each of the plurality of front end processors; and a plurality of back end processors associated with a plurality of groups of spatial division multiple access (SDMA) users, wherein each of the plurality of processing modules is coupled to each of the plurality of back end processors, and wherein each of the plurality of back end processors is configured to process symbol data for a respective group of SDMA users, wherein SDMA users of individual groups of SDMA users are different from SDMA users of other groups;

wherein each of the plurality of processing modules is configured to process symbol data of the respective subchannel group, including applying adaptive weights to the symbol data of each subchannel, and output the adaptively weighed symbol data to the back end processors, such that each of the plurality of back end processors receives the adaptively weighed symbol data for the corresponding group of SDMA users from each of the plurality of processing modules.

2. The apparatus of claim 1, wherein one or more of the front end processors comprises one or more multiplexers to multiplex symbol data of the subchannels of a subchannel group.

3. The apparatus of claim 1, wherein one or more of the back end processors comprises one or more subchannel mapping and demapping units designed to perform symbol data mapping and demapping for the subchannel groups.

4. The apparatus of claim 1, wherein one or more of the back end processors comprises coder and decoder units designed to perform coding and decoding operations on the symbol data for the subchannel groups.

5. The apparatus of claim 1, wherein one or more of the back end processors comprises one or more scrambler and descrambler units designed to perform scrambling and descrambling operations on the encoded symbol data for the subchannel groups.

6. The apparatus of claim 1, wherein the apparatus is embodied in an integrated circuit.

7. The apparatus of claim 1, wherein each of the processing modules comprises a plurality of buffers for temporally buffering the weighted symbol data of each of the subchannels of the respective subchannel group.

8. The apparatus of claim 1, wherein each of the back end processors is configured to output symbol data of a plurality of subchannel groups of a plurality of signals associated with a respective group of SDMA users, such that each of the processing modules receives symbol data for the respective group of subchannels;

wherein each of the processing modules is configured to calculate adaptive weights and apply the calculated adaptive weights to the received symbol data for adaptive transmission of the weighed symbol data of the respective subchannel group.

9. A system comprising:

a plurality of omnidirectional antennas divided into one or more antenna groups, each antenna group including one or more of the plurality of omnidirectional antennas;

a plurality of processing modules associated with a plurality of groups of subchannels such that each processing module is assigned to process symbol data of a corresponding group of subchannels, each subchannel group including a respective plurality of subchannels, wherein subchannels of individual groups are different from subchannels of other groups;

a plurality of front end processors, wherein each of the plurality of processing modules is coupled to each of the plurality of front end processors, and wherein each of the plurality of front end processors is configured to receive and process signals from a respective antenna group and output symbol data for the plurality of subchannel groups, such that each of the plurality of processing modules receives the symbol data for the corresponding group of subchannels from each of the plurality of front end processors; and a plurality of back end processors associated with a plurality of groups of spatial division multiple access (SDMA) users, wherein each of the plurality of processing modules is coupled to each of the plurality of back end processors, and wherein each of the plurality of back end processors is configured to process symbol data for a respective group of SDMA users, wherein SDMA users of individual groups of SDMA users are different from SDMA users of other groups;

wherein each of the plurality of processing modules is configured to process symbol data of the respective subchannel group, including applying adaptive weights to the symbol data, and output the adaptively weighed symbol data to the back end processors, such that each of the plurality of back end processors receives the adaptively weighed symbol data for the corresponding group of SDMA users from each of the plurality of processing modules.

10. The system of claim 9, wherein each of the front end processors, processing modules and back end processors is embodied in an integrated circuit, and the integrated circuit is embodied in a chipset.

11. The system of claim 9, wherein one or more of the front end processors comprises one or more multiplexres to multiplex symbol data of each subchannel of a subchannel group.

12. The system of claim 9, wherein one or more of the back end processors comprises one or more subchannel mapping and demapping units designed to perform symbol data mapping and demapping for the subchannel groups.

13. The system of claim 9, wherein one or more of the back end processors comprises coder and decoder units designed to perform coding and decoding operations on the symbol data for the subchannel groups.

14. The apparatus of claim 1, wherein each of the plurality of processing modules is configured to receive the symbol data for only the corresponding group of subchannels from each of the plurality of front end processors.

15. An apparatus comprising:

a first processing module associated with a first plurality of consecutive subchannels;

a second processing module associated with a second plurality of consecutive subchannels, such that the first plurality of consecutive subchannels and the second plurality of consecutive subchannels consist of different subchannels;

a first front end processor coupled to each of the first and second processing modules, wherein the first front end processor is configured to receive and process signals from a first group of antennas, and further configured to output symbol data for subchannels in the first plurality of subchannels to the first processing module and to output symbol data for subchannels in the second plurality of subchannels to the second processing module;

a second front end processor coupled to each of the first and second processing modules, wherein the second front end processor is configured to receive and process signals from a second group of antennas that is different from the first group of antennas, and further configured to output symbol data for subchannels in the first plurality of subchannels to the first processing module and to output symbol data for subchannels in the second plurality of subchannels to the second processing module;

a first back end processor associated with a first group of spatial division multiple access (SDMA) users, wherein the first back end processor is coupled to each of the first and second processing modules, and wherein the first back end processor is configured to receive symbol data for the first group of SDMA users from the first and second processing modules; and a second back end processor associated with a second group of SDMA users that is different from the first group of SDMA users, wherein the second back end processor is coupled to each of the first and second processing modules, and wherein the second back end processor is configured to receive symbol data for the second group of SDMA users from the first and second processing modules;

wherein each of the first and second processing modules is configured to process symbol data of the respective plurality of subchannels, including applying adaptive weights to the symbol data of each subchannel, and output the adaptively weighed symbol data to the back end processors, such that each of the first and second back end processors receives the adaptively weighed symbol data for the corresponding group of SDMA users from each of the first and second processing modules.

* * * * *

UNITED STATES PATENT AND TRADEMARK OFFICE

CERTIFICATE OF CORRECTION

PATENT NO. : 7,738,585 B2
APPLICATION NO. : 11/234581
DATED : June 15, 2010
INVENTOR(S) : Jaroslaw J. Sydir et al.

It is certified that error appears in the above-identified patent and that said Letters Patent is hereby corrected as shown below:

Fig. 1
Page 1 of 8 of the Drawings, Reference number “100” was omitted from the bottom left of the figure.
Fig. 2
Page 1 of 8 of the Drawings, Reference number “200” was omitted from the top of the figure.
Fig. 3
Page 2 of 8 of the Drawings, Reference number “300” was omitted from the middle left of the figure.
Fig. 4
Page 3 of 8 of the Drawings, Reference number “400” was omitted from the bottom of the figure.
Fig. 5
Page 3 of 8 of the Drawings, Reference number “500” was omitted from the bottom of the figure.
Fig. 6
Page 4 of 8 of the Drawings, Reference number “600” was omitted from the top of the figure.
Fig. 7
Page 5 of 8 of the Drawings, Reference number “700” was omitted from the bottom right of the figure.
Fig. 8A and Fig. 8B
Page 6 of 8 of the Drawings, Reference number “800” was omitted from the top of the figures.
Fig. 9
Page 7 of 8 of the Drawings, Reference number “900” was omitted from the top right of the figure.
Fig. 10
Page 8 of 8 of the Drawings, Reference number “1000” was omitted from the top right of the figure.
Column 13
Line 50, “...multiplexers...” should read --...multiplexers [or multiplexres]...--.
Column 14
Line 60, “...multiplexers...” should read --...multiplexers [or multiplexres]...--.

Signed and Sealed this
Twenty-fifth Day of September, 2012

David J. Kappos
*Director of the United States Patent and Trademark Office*